(12) United States Patent
Yamada et al.

(10) Patent No.: US 10,447,320 B2
(45) Date of Patent: Oct. 15, 2019

(54) TERMINAL APPARATUS, BASE STATION APPARATUS, AND COMMUNICATION METHOD

(71) Applicant: SHARP KABUSHIKI KAISHA, Sakai, Osaka (JP)

(72) Inventors: Ryota Yamada, Sakai (JP); Kazuyuki Shimezawa, Sakai (JP); Takashi Yoshimoto, Sakai (JP); Hiromichi Tomeba, Sakai (JP)

(73) Assignee: Sharp Kabushiki Kaisha, Sakai, Osaka (JP)

( * ) Notice: Subject to any disclaimer, the term of this patent is extended or adjusted under 35 U.S.C. 154(b) by 0 days.

(21) Appl. No.: 15/504,546

(22) PCT Filed: Jul. 31, 2015

(86) PCT No.: PCT/JP2015/071879
§ 371 (c)(1),
(2) Date: Feb. 16, 2017

(87) PCT Pub. No.: WO2016/027646
PCT Pub. Date: Feb. 25, 2016

(65) Prior Publication Data
US 2017/0244435 A1 Aug. 24, 2017

(30) Foreign Application Priority Data
Aug. 20, 2014 (JP) .................... 2014-167061

(51) Int. Cl.
*H04B 1/10* (2006.01)
*H04W 16/28* (2009.01)
(Continued)

(52) U.S. Cl.
CPC ............. *H04B 1/1027* (2013.01); *H04B 1/10* (2013.01); *H04B 7/0697* (2013.01);
(Continued)

(58) Field of Classification Search
CPC ... H04B 1/1027; H04B 7/0697; H04L 1/0003; H04L 5/0051; H04W 72/042
See application file for complete search history.

(56) References Cited

U.S. PATENT DOCUMENTS

2010/0054358 A1* 3/2010 Ko ................ H04B 7/0639
375/267
2011/0222485 A1* 9/2011 Nangia ............ H04B 7/0452
370/329
(Continued)

FOREIGN PATENT DOCUMENTS

WO WO 2014/122994 A1 8/2014

OTHER PUBLICATIONS

MediaTek et al., "Study on Network-Assisted Interference Cancellation and Suppression for LTE", RP-130404, 3GPP TSG RAN Meeting #59, Vienna, Austria, Feb. 26-Mar. 1, 2013, 7 Pages.

*Primary Examiner* — Janice N Tieu
(74) *Attorney, Agent, or Firm* — Birch, Stewart, Kolasch & Birch, LLP

(57) ABSTRACT

An object is to mitigate interference by using effective knowledge or information as to an interference signal while reducing an increase in the amount of calculation. A terminal device includes a reception unit that receives downlink control information from a base station apparatus. In a case of a prescribed transmission mode, a downlink shared channel destined for the terminal apparatus is demodulated on the basis of a power offset between transmit power of the terminal apparatus and transmit power of another terminal apparatus in the downlink shared channel included in the downlink control information. Whether or not to perform interference cancellation is determined according to a value of the power offset.

8 Claims, 3 Drawing Sheets

(51) Int. Cl.
  *H04B 7/06* (2006.01)
  *H04L 1/00* (2006.01)
  *H04L 5/00* (2006.01)
  *H04W 72/04* (2009.01)
  *H04B 7/0452* (2017.01)

(52) U.S. Cl.
  CPC ............ *H04L 1/0003* (2013.01); *H04L 5/005* (2013.01); *H04L 5/0051* (2013.01); *H04W 16/28* (2013.01); *H04W 72/042* (2013.01); *H04B 7/0452* (2013.01)

(56) References Cited

U.S. PATENT DOCUMENTS

| | | | |
|---|---|---|---|
| 2012/0120907 A1* | 5/2012 | Kishigami | H04B 7/0697 370/329 |
| 2012/0322492 A1* | 12/2012 | Koo | H04B 7/022 455/517 |
| 2013/0250879 A1* | 9/2013 | Ng | H04W 72/042 370/329 |
| 2014/0153488 A1* | 6/2014 | Koivisto | H04B 1/10 370/328 |
| 2014/0233466 A1* | 8/2014 | Pourahmadi | H04L 5/0051 370/329 |
| 2016/0029350 A1 | 1/2016 | Kishiyama et al. | |
| 2016/0095089 A1* | 3/2016 | Wong | H04W 72/042 370/328 |

\* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method.

BACKGROUND ART

In a communication system such as long term evolution (LTE) and LTE-advanced (LTE-A) by Third Generation Partnership Project (3GPP) or worldwide interoperability for microwave access (WiMAX), a communication area can be enlarged by using a cellular composition in which a plurality of areas covered by a base station apparatus (a base station, a transmission station, a transmission point, a downlink transmission apparatus, an uplink reception apparatus, a transmit antenna group, a transmit antenna port group, a component carrier, or an eNodeB) or a transmission station corresponding to a base station apparatus is arranged in cells. In the cellular composition, frequency efficiency can be improved by using the same frequency between neighbor cells or sectors.

However, in such a cellular composition, a terminal apparatus (a mobile station apparatus, a reception station, a reception point, an uplink transmission apparatus, a downlink reception apparatus, a mobile terminal, a receive antenna group, a receive antenna port group, or user equipment (UE)) in a cell edge region or a sector edge region receives interference from a transmit signal of a base station apparatus constituting another cell or another sector (inter-cell interference or inter-sector interference), thereby posing a problem in that frequency efficiency is decreased.

As a measure against inter-cell interference or inter-sector interference, the speed of reception performance of the terminal apparatus is increased (advanced receiver). For example, in NPL 1, a minimum mean square error interference rejection combining (MMSE-IRC) receiver, an interference cancellation receiver, an interference suppression receiver, a maximal likelihood detection receiver (MLD receiver), and the like are described as a high speed receiver. Accordingly, limitations from inter-cell interference can be alleviated, and thus improvement in frequency efficiency can be achieved.

In the communication system, spatial multiplexing transmission (multi input multi output (MIMO)) is applied in order to realize efficient data transmission. The high speed receiver is used in order to suppress inter-stream interference (inter-layer interference or inter-antenna interference) generated in spatial multiplexing transmission, and thus improvement in frequency efficiency can be achieved.

CITATION LIST

Non Patent Literature

NPL 1: "Study on Network Assisted Interference Cancellation and Suppression for LTE", 3GPP TSG RAN Meeting #59, RP-130404, March 2013.

SUMMARY OF INVENTION

Technical Problem

The advanced receiver requires knowledge or information related to an interference signal (for example, a parameter for demodulation) in order to mitigate interference. However, the base station apparatus transmitting knowledge or information related to an interference signal to the terminal apparatus poses a problem in that signaling overhead is increased. In addition, if the base station apparatus has less knowledge or information related to an interference signal with respect to the terminal apparatus, the terminal apparatus side is required to estimate information as to an interference signal, thereby posing a problem in that the amount of calculation of the terminal apparatus is increased.

The present invention is conceived in view of such matters, and an object thereof is to provide a terminal apparatus, a base station apparatus, and a communication method that can mitigate interference by using effective knowledge or information as to an interference signal while an increase in the amount of calculation is mitigated.

Solution to Problem

Composition of a terminal apparatus, a base station apparatus, and a communication method according to the present invention for resolving the above problems is as follows.

A terminal apparatus of the present invention includes a reception unit that receives downlink control information from a base station apparatus, in which in a case of a prescribed transmission mode, a downlink shared channel destined for the terminal apparatus is demodulated on the basis of a power offset between transmit power of the terminal apparatus and transmit power of another terminal apparatus in the downlink shared channel included in the downlink control information.

In the terminal apparatus of the present invention, whether or not to perform interference cancellation is determined according to a value of the power offset.

A base station apparatus of the present invention includes a transmission unit that transmits downlink control information to the terminal apparatus, in which in a case of a prescribed transmission mode, a power offset between transmit power of the base station apparatus and transmit power of another base station apparatus in a downlink shared channel is included in the downlink control information.

In the base station apparatus of the present invention, a value of the power offset indicates whether or not interference cancellation is required in the terminal apparatus.

A communication method of the present invention is a communication method for a terminal apparatus that communicates with a base station apparatus, the method including at least a reception step of receiving downlink control information from the base station apparatus, in which in a case of a prescribed transmission mode, a downlink shared channel destined for the terminal apparatus is demodulated on the basis of a power offset between transmit power of the terminal apparatus and transmit power of another terminal apparatus in the downlink shared channel included in the downlink control information.

A communication method of the present invention is a communication method for a base station apparatus that communicates with a terminal apparatus, the method including at least a transmission step of transmitting downlink control information to the terminal apparatus, in which in a case of a prescribed transmission mode, a power offset between transmit power of the base station apparatus and transmit power of another base station apparatus in a downlink shared channel is included in the downlink control information.

Advantageous Effects of Invention

According to the present invention, interference can be effectively mitigated in a radio environment where an interference signal arrives, while an increase in the amount of calculation is reduced.

DESCRIPTION OF EMBODIMENTS

A communication system in the present embodiment includes a base station apparatus (a transmission apparatus, a cell, a transmission point, a transmit antenna group, a transmit antenna port group, a component carrier, or an eNodeB) and a terminal apparatus (a terminal, a mobile terminal, a reception point, a reception terminal, a reception apparatus, a receive antenna group, a receive antenna port group, or UE).

In the present embodiment, "X/Y" includes the meaning of "X or Y". In the present embodiment, "X/Y" includes the meaning of "X and Y". In the present embodiment, "X/Y" includes the meaning of "X and/or Y".

Figure 1:
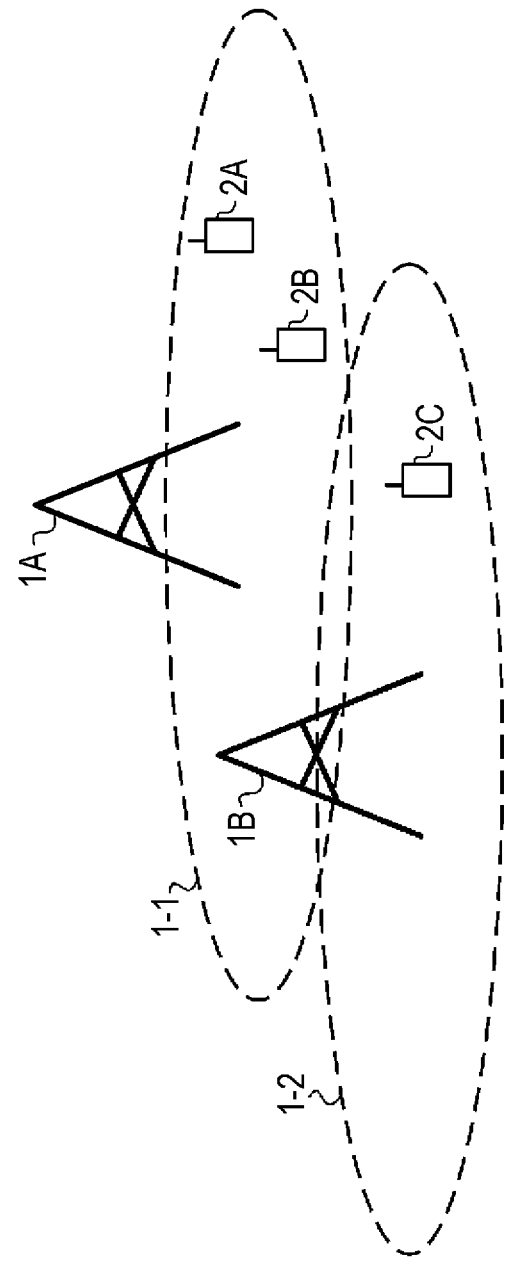
FIG. 1 is a diagram illustrating an example of a communication system according to the present embodiment.

FIG. 1 is a diagram illustrating an example of the communication system according to the present embodiment. As illustrated in FIG. 1, the communication system in the present embodiment includes base station apparatuses 1A and 1B and terminal apparatuses 2A, 2B, and 2C. A coverage 1-1 is an area (communication area) in which the base station apparatus 1A can be connected with a terminal apparatus. A coverage 1-2 is an area (communication area) in which the base station apparatus 1B can be connected with a terminal apparatus. Hereinafter, the terminal apparatuses 2A and 2B may be described as a terminal apparatus 2.

In FIG. 1, in the case of the base station apparatus 1A spatially multiplexing the terminal apparatus 2A and the terminal apparatus 2B or in the case of the terminal apparatus 2 receiving inter-cell interference from the base station apparatus 1B, receive signals in the terminal apparatus 2 include a desired signal destined for the terminal apparatus 2 (referred to as a first terminal apparatus) and a signal destined for an interfering terminal apparatus (referred to as a second terminal apparatus). Specifically, receive signals in the terminal apparatus 2A include a desired signal destined for the terminal apparatus 2A and transmitted from the base station apparatus 1A and interference signals of a signal destined for the terminal apparatus 2B and a signal destined for the terminal apparatus 2C and transmitted from the base station apparatus 1B. Receive signals in the terminal apparatus 2B include a desired signal destined for the terminal apparatus 2B and transmitted from the base station apparatus 1A and interference signals of a signal destined for the terminal apparatus 2A and a signal destined for the terminal apparatus 2C and transmitted from the base station apparatus 1B.

In the present embodiment, a base station apparatus spatially multiplexes a plurality of terminal apparatuses. Thus, the present invention is preferably for the case of the terminal apparatus receiving inter-user interference or the case of the terminal apparatus receiving inter-cell interference from another base station apparatus and is not limited to the communication system of FIG. 1. Inter-user interference and inter-cell interference are not required to be received at the same time. The present invention includes any of the case of receiving only inter-user interference and the case of receiving only inter-cell interference.

The following uplink physical channels are used in uplink radio communication from the terminal apparatus 2 to the base station apparatus 1A in FIG. 1. The uplink physical channels are used in order to transmit information output from a higher layer.

Physical uplink control channel (PUCCH)
Physical uplink shared channel (PUSCH)
Physical random access channel (PRACH)

PUCCH is used in order to transmit uplink control information (UCI). The uplink control information includes a positive acknowledgement (ACK) or a negative acknowledgement (NACK) (ACK/NACK) for downlink data (downlink transport block or downlink shared channel (DL-SCH)). ACK/NACK for downlink data may be referred to as HARQ-ACK or HARQ feedback.

The uplink control information includes channel state information (CSI) for a downlink. In addition, the uplink control information includes a scheduling request (SR) that is used in order to request the resource of an uplink shared channel (UL-SCH). The channel state information corresponds to a rank indicator RI that specifies an appropriate number of spatial multiplexing, a precoding matrix indicator PMI that specifies an appropriate precoder, a channel quality indicator CQI that specifies an appropriate transmission rate, and the like.

The channel quality indicator CQI (hereinafter, a CQI value) can be an appropriate modulation scheme (for example, QPSK, 16QAM, 64QAM, or 256QAM) in a prescribed band (described in detail later) or a code rate. The CQI value can be an index (CQI index) that is determined by the change scheme or the code rate. The CQI value can be determined in advance in the system.

The rank indicator and the precoding quality indicator can be determined in advance in the system. The rank indicator or the precoding matrix indicator can be an index that is determined by the number of spatial multiplexing or precoding matrix information. The rank indicator, the precoding matrix indicator, and the value of the channel quality indicator CQI are collectively referred to as a CSI value.

PUSCH is used in order to transmit uplink data (uplink transport block or UL-SCH). PUSCH may be used in order to transmit ACK/NACK and/or the channel state information along with the uplink data. In addition, PUSCH may be used in order to transmit only the uplink control information.

PUSCH is used in order to transmit an RRC message. The RRC message is information/signal that is processed in a radio resource control (RRC) layer. In addition, PUSCH is used in order to transmit an MAC control element (CE). MAC CE is information/signal that is processed (transmitted) in a medium access control (MAC) layer.

For example, power headroom may be included in MAC CE and reported via PUSCH. That is, a field of MAC CE may be used in order to indicate the level of power headroom.

PRACH is used in order to transmit a random access preamble.

In uplink radio communication, an uplink reference signal (UL RS) is used as an uplink physical signal. The uplink physical signal is not used for transmitting information output from a higher layer and is used by a physical layer. The uplink reference signal includes a demodulation reference signal (DMRS) and a sounding reference signal (SRS).

DMRS is associated with transmission in PUSCH or PUCCH. For example, the base station apparatus 1A uses DMRS in order to perform propagation channel correction of PUSCH or PUCCH. SRS is not associated with transmission in PUSCH or PUCCH. For example, the base station apparatus 1A uses SRS in order to measure the uplink channel state.

The following downlink physical channels are used in downlink radio communication from the base station apparatus 1A to the terminal apparatus 2 in FIG. 1. The downlink physical channels are used in order to transmit information output from a higher layer.

Physical broadcast channel (PBCH)
Physical control format indicator channel (PCFICH)
Physical hybrid automatic repeat request indicator channel (PHICH; HARQ indicator channel)
Physical downlink control channel (PDCCH)
Enhanced physical downlink control channel (EPDCCH)
Physical downlink shared channel (PDSCH)

PBCH is used in order to broadcast master information block (MIB; broadcast channel (BCH)) that is used in common in the terminal apparatus 2. PCFICH is used in order to transmit information that indicates a region (for example, the number of OFDM symbols) used in transmission in PDCCH.

PHICH is used in order to transmit ACK/NACK for uplink data (transport block or code word) received by the base station apparatus 1A. That is, PHICH is used in order to transmit an HARQ indicator (HARQ feedback) that indicates ACK/NACK for the uplink data. ACK/NACK is referred to as HARQ-ACK as well. The terminal apparatus 2 notifies a higher layer of the received ACK/NACK. ACK/NACK includes ACK that indicates correct reception, NACK that indicates incorrect reception, and DTX that indicates that there is no corresponding data. In the case of PHICH not existing for uplink data, the terminal apparatus 2 notifies a higher layer of ACK.

PDCCH and EPDCCH are used in order to transmit downlink control information (DCI). A plurality of DCI formats is defined for transmission of the downlink control information. That is, a field for the downlink control information is defined in a DCI format and is mapped to an information bit.

As a DCI format for the downlink, for example, a DCI format 1A that is used in scheduling of one PDSCH (transmission of one downlink transport block) in one cell is defined.

The DCI format for the downlink, for example, includes the downlink control information such as information related to PDSCH resource assignment, information related to a modulation and coding scheme (MCS) for PDSCH, and a TPC command for PUCCH. The DCI format for the downlink is referred to as downlink grant (or downlink assignment) as well.

As a DCI format for an uplink, for example, a DCI format 0 that is used in scheduling of one PUSCH (transmission of one uplink transport block) in one cell is defined.

The DCI format for the uplink, for example, includes the uplink control information such as information related to PUSCH resource assignment, information related to MCS for PUSCH, and a TPC command for PUSCH. The DCI format for the uplink is referred to as uplink grant (or uplink assignment) as well.

The DCI format for the uplink can be used in order to request the channel state information (CSI; referred to as reception quality information as well) of the downlink (CSI request). The channel state information corresponds to the rank indicator (RI) that specifies an appropriate number of spatial multiplexing, the precoding matrix indicator (PMI) that specifies an appropriate precoder, the channel quality indicator (CQI) that specifies an appropriate transmission rate, and the like.

The DCI format for the uplink can be used for a configuration that indicates an uplink resource to which a channel state information report (CSI feedback report) fed back to the base station apparatus by the terminal apparatus is mapped. For example, the channel state information report can be used for a configuration indicating an uplink resource that periodically reports the channel state information (periodic CSI). The channel state information report can be used in order to configure a mode (CSI report mode) that periodically reports the channel state information.

For example, the channel state information report can be used for a configuration indicating an uplink resource that reports aperiodic channel state information (aperiodic CSI). The channel state information report can be used in order to configure a mode (CSI report mode) that aperiodically reports the channel state information. The base station apparatuses 1A and 1B can configure any of the periodic channel state information report and the aperiodic channel state information report. In addition, the base station apparatuses 1A and 1B can configure both of the periodic channel state information report and the aperiodic channel state information report.

The DCI format for the uplink can be used for a configuration that indicates the type of the channel state information report fed back to the base station apparatus by the terminal apparatus. The type of the channel state information report is wideband CSI (for example, wideband CQI), narrowband CSI (for example, subband CQI), or the like.

The DCI format for the uplink can be used in order to configure a mode that includes the periodic channel state information report or the aperiodic channel state information report and the type of the channel state information report. For example, there is a mode that reports the aperiodic channel state information report and wideband CSI, a mode that reports the aperiodic channel state information report and narrowband CSI, a mode that reports the aperiodic channel state information report, wideband CSI, and narrowband CSI, a mode that reports the periodic channel state information report and wideband CSI, a mode that reports the periodic channel state information report and narrowband CSI, a mode that reports the periodic channel state information report, wideband CSI, and narrowband CSI, or the like.

The terminal apparatus 2, in the case of the resource of PDSCH being scheduled by using downlink assignment, receives downlink data in scheduled PDSCH. The terminal apparatus 2, in the case of the resource of PUSCH being scheduled by using uplink grant, transmits uplink data and/or the uplink control information in scheduled PUSCH.

PDSCH is used in order to transmit downlink data (downlink transport block or DL-SCH). In addition, PDSCH is used in order to transmit a system information block type 1 message. The system information block type 1 message is cell-specific information.

PDSCH is used in order to transmit a system information message. The system information message includes a system information block X other than a system information block type 1. The system information message is cell-specific information.

PDSCH is used in order to transmit an RRC message. An RRC message transmitted from the base station apparatus 1A may be common to the plurality of terminal apparatuses 2 in a cell. The RRC message transmitted from the base station apparatus 1A may be a message dedicated to a certain terminal apparatus 2 (referred to as dedicated signaling as well). That is, information that is specific to a user apparatus is transmitted by using a message dedicated to a certain terminal apparatus 2. In addition, PDSCH is used in order to transmit MAC CE.

An RRC message and/or MAC CE is referred to as higher layer signaling as well.

PDSCH can be used in order to request downlink channel state information. In addition, PDSCH can be used in order to transmit an uplink resource to which the channel state information report (CSI feedback report) fed back to the base station apparatus by the terminal apparatus is mapped. For example, the channel state information report can be used for a configuration indicating an uplink resource that periodically reports the channel state information (periodic CSI). The channel state information report can be used in order to configure a mode (CSI report mode) that periodically reports the channel state information.

The type of the downlink channel state information report is wideband CSI (for example, wideband CSI) or narrowband CSI (for example, subband CSI). Wideband CSI calculates one piece of channel state information for the system band of a cell. Narrowband CSI divides the system band in prescribed units and calculates one piece of channel state information for the division.

In downlink radio communication, a synchronization signal (SS) and a downlink reference signal (DL RS) are used as a downlink physical signal. The downlink physical signal is not used for transmitting information output from a higher layer and is used by the physical layer.

The synchronization signal is used in order for the terminal apparatus 2 to synchronize a downlink frequency domain with a time domain. The downlink reference signal is used in order for the terminal apparatus 2 to perform propagation channel correction of the downlink physical channel. For example, the downlink reference signal is used in order for the terminal apparatus 2 to calculate the downlink channel state information.

The downlink reference signal includes a cell-specific reference signal (CRS), a UE-specific reference signal (URS) associated with PDSCH, a demodulation reference signal (DMRS) associated with EPDCCH, a non-zero power channel state information reference signal (NZP CSI-RS), and a zero power chanel state information reference signal (ZP CSI-RS).

CRS is transmitted in the entire band of a subframe and is used in order to demodulate PBCH/PDCCH/PHICH/PCFICH/PDSCH. URS that is associated with PDSCH is transmitted in a subframe and a band used in transmission of PDSCH with which URS is associated, and is used in order to demodulate PDSCH with which URS is associated.

DMRS that is associated with EPDCCH is transmitted in a subframe and a band used in transmission of EPDCCH with which DMRS is associated. DMRS is used in order to demodulate EPDCCH with which DMRS is associated.

The resource of NZP CSI-RS is configured by the base station apparatus 1A. For example, the terminal apparatus 2 measures a signal (measures a channel) by using NZP CSI-RS. The resource of ZP CSI-RS is configured by the base station apparatus 1A. The base station apparatus 1A transmits ZP CSI-RS as a zero output. For example, the terminal apparatus 2 measures interference in the resource to NZP CSI-RS corresponds.

The resource of ZP CSI-RS is configured by the base station apparatus 1A. The base station apparatus 1B transmits ZP CSI-RS as a zero output. That is, the base station apparatus 1A does not transmit ZP CSI-RS. The base station apparatus 1B does not transmit PDSCH and EPDCCH in the configured resource of ZP CSI-RS. The terminal apparatus 2C can measure interference in, for example, the resource to which NZP CSI-RS corresponds in a certain cell.

Multimedia broadcast multicast service single frequency network (MBSFN) RS is transmitted in the entire band of a subframe used in transmission of PMCH. MBSFN RS is used in order to demodulate PMCH. PMCH is transmitted in an antenna port used in transmission of MBSFN RS.

The downlink physical channel and the downlink physical signal are collectively referred to as a downlink signal as well. The uplink physical channel and the uplink physical signal are collectively referred to as an uplink signal as well. The downlink physical channel and the uplink physical channel are collectively referred to as a physical channel as well. The downlink physical signal and the uplink physical signal are collectively referred to as a physical signal as well.

BCH, UL-SCH, and DL-SCH are transport channels. A channel that is used in the MAC layer is referred to as a transport channel. The unit of the transport channel used in the MAC layer is referred to as a transport block (TB) or a MAC protocol data unit (PDU) as well. The transport block is the unit of data that the MAC layer passes (delivers) to the physical layer. In the physical layer, the transport block is mapped to a code word, and a coding process or the like is performed for each code word.

The terminal apparatus can include a function of removing or suppressing inter-user interference or inter-cell interference. Such a technology is under review as network assisted interference cancellation and suppression (NAICS) by 3rd Generation Partnership Project (3GPP). In NAICS, the base station apparatus transmits NAICS assistance information (called support information or first support information as well) that the terminal apparatus uses in order to handle, cancel, or suppress an interference signal. The terminal apparatus receives the NAICS assistance information, detects a parameter for cancellation or suppression of an interference signal on the basis of the NAICS assistance information, and cancels or suppresses an interference signal by using the parameter. The NAICS assistance information includes a part or the entirety of cell ID, the number of CRS antenna ports, an MBSFN subframe configuration list, PB, virtual cell ID, a scrambling identity (nSCID), PA, a transmission mode, quasi co-location information (QCL information), a ZP/NZP CSI-RS configuration, a PDSCH starting position, a TDD UL/DL configuration, a precoding matrix indicator/rank indicator, a modulation scheme, and resource assignment information.

PA is the power ratio of PDSCH and CRS in an OFDM symbol where CRS is not arranged. PB represents the power ratio of PDSCH in an OFDM symbol where CRS is arranged and PDSCH in an OFDM symbol where CRS is not arranged. QCL information is information related to QCL for a prescribed antenna port, a prescribed signal, or a prescribed channel. For two antenna ports, in a case where the long-term characteristic of a channel in which a symbol on one antenna port is transported can be estimated from a channel in which a symbol on another antenna port is transported, these antenna ports are called QCL. The long-term characteristic includes a delay spread, a Doppler spread, a Doppler shift, an average gain and/or an average delay. That is, in the case of two antenna ports being QCL, the terminal apparatus can regard the long-term characteristics in these antenna ports as being the same.

In the case of including, as the function of NAICS, non-orthogonal access or multi-user multiple input multiple output (MU-MIMO) that spatially multiplexes a plurality of signals destined for the terminal apparatus on the base station apparatus side, the base station apparatus can also include information related to MU-MIMO or non-orthogonal access in the NAICS assistance information. Inter-user interference in MU-MIMO or non-orthogonal access is called in-cell interference as well.

In non-orthogonal access, the terminal apparatus cancels or suppresses an interference signal by using NAICS in the case of each signal destined for the terminal apparatus being assigned different transmit power and a signal destined for another terminal apparatus (that is, an interference signal) having greater transmit power or received power than the signal destined for the terminal apparatus. Meanwhile, in the case of an interference signal having smaller transmit power or received power than the signal destined for the terminal apparatus, an interference signal is not necessarily canceled or suppressed by NAICS (may be canceled or suppressed).

Information related to MU-MIMO or non-orthogonal access is, for example, information related to transmit power and whether or not the base station apparatus supports MU-MIMO or non-orthogonal access (for example, a transmission mode).

Each parameter included in the NAICS assistance information may have one value (candidate) configured or may have a plurality of values (candidates) configured. In the case of configuring a plurality of values, the terminal apparatus analyzes the parameter as indicating a value that is likely to be configured by an interfering base station apparatus, and detects a parameter configured for an interference signal from the plurality of values. The NAICS assistance information may indicate information as to another base station apparatus or may indicate information as to the base station apparatus.

The NAICS assistance information is used by the terminal apparatus at the time of demodulating PDSCH for the terminal apparatus in order to handle, cancel, or suppress interference from PDSCH for another terminal apparatus. Thus, the NAICS assistance information is called PDSCH interference assistance information or PDSCH assistance information. The NAICS assistance information includes at least information related to mapping with respect to a resource element of PDSCH for another terminal apparatus. The NAICS assistance information may be used at the time of performing various measurements. The measurements include a radio resource management (RRM) measurement, a radio link monitoring (RLM) measurement, and a channel state information (CSI) measurement.

The terminal apparatus detects (specifies) PDSCH interference on the basis of the configured NAICS assistance information and mitigates the detected PDSCH interference. The NAICS assistance information may include quasi-static control information having a comparatively long update frequency and not include dynamic control information having a comparatively short update frequency. The quasi-static control information includes cell ID, the number of CRS antenna ports, an MBSFN subframe pattern, PB, virtual cell ID, a scrambling identity (nSCID), PA, a transmission mode, quasi co-location information (QCL information), a ZP/NZP CSI-RS configuration, a PDSCH starting position, a TDD UL/DL configuration, and the like. The dynamic control information includes a precoding matrix indicator/rank indicator, a modulation scheme, resource assignment information, and the like. As described previously, each parameter included in the NAICS assistance information may have a plurality of values (candidates) configured. Thus, the NAICS assistance information can be regarded as information for indicating a plurality of PDSCH interference candidates. The terminal apparatus can perform blind detection that tries detecting, in order, PDSCH interference candidates which can be recognized on the basis of the NAICS assistance information.

Accordingly, the terminal apparatus can mitigate interference from PDSCH for another terminal apparatus on the basis of the parameter detected from the NAICS assistance information and thus can accurately acquire a signal destined for the terminal apparatus. In the case of the NAICS assistance information indicating a plurality of candidates, less influence can be exerted on scheduling of the base station apparatus. The terminal apparatus may perform blind detection of a parameter that is not received as the assistance information. Cancellation or suppression of an interference signal can be performed by linear detection or non-linear detection. The linear detection allows detection considering a channel of a desired signal destined for the terminal apparatus and a channel of an interference signal destined for another terminal apparatus. Such linear detection is called enhanced linear minimum mean square error interference rejection combining (ELMMSE-IRC) as well. As the non-linear detection, an interference canceller or maximum likelihood detection can be used.

The base station apparatus can change the NAICS assistance information into a list as an NAICS assistance information list and transmit the NAICS assistance information list. The NAICS assistance information list can include at least one piece of NAICS assistance information. In addition, the NAICS assistance information list can be transmitted as neighbor cell NAICS information (called first interference information as well). The NAICS assistance information list may be called a PDSCH assistance information list as well. The neighbor cell NAICS information may be called neighbor cell PDSCH information as well.

The terminal apparatus, in the case of interference from CRS transmitted from another base station apparatus, can mitigate interference received from CRS of another base station apparatus by using CRS assistance information (called second support information as well) that is transmitted by a higher layer signal from the base station apparatus. The CRS assistance information is information as to another base station apparatus and includes cell ID, the number of CRS antenna ports, and an MBSFN subframe configuration list.

The CRS assistance information is transmitted after changing into a list by a CRS assistance information list. The CRS assistance information list includes at least one piece of CRS assistance information. The CRS assistance information list is transmitted as neighbor cell CRS information (called second interference information as well).

The CRS assistance information is used by the terminal apparatus at the time of demodulating PDSCH for the terminal apparatus in order to handle, cancel, or suppress interference from CRS of another cell (neighbor cell). The CRS assistance information may be used at the time of performing various measurements. The measurements include a radio resource management (RRM) measurement, a radio link monitoring (RLM) measurement, and a channel state information (CSI) measurement.

The NAICS assistance information can be used by the terminal apparatus not only for PDSCH interference but also in the case of handling CRS interference or interference of other channels.

Figure 2:
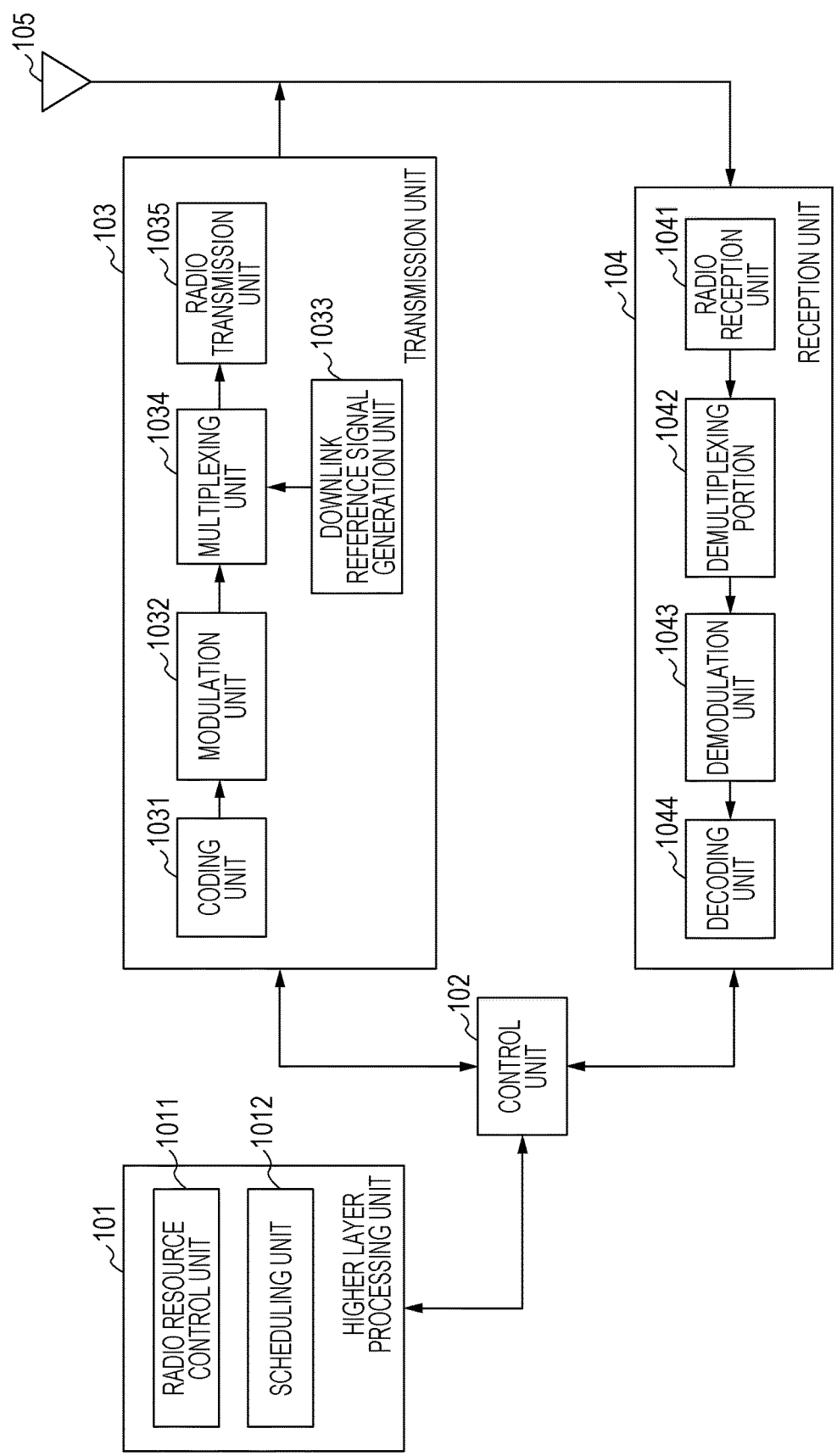
FIG. 2 is a block diagram illustrating a composition example of a base station apparatus according to the present embodiment.

FIG. 2 is a schematic block diagram illustrating composition of the base station apparatus 1A in the present embodiment. As illustrated in FIG. 2, the base station apparatus 1A is constituted to include a higher layer processing unit 101, a control unit 102, a transmission unit 103, a reception unit 104, and a transmit and receive antenna 105. The higher layer processing unit 101 is constituted to include a radio resource control unit 1011 and a scheduling unit 1012. The transmission unit 103 is constituted to include a coding unit 1031, a modulation unit 1032, a downlink reference signal generation unit 1033, a multiplexing unit 1034, and a radio transmission unit 1035. The reception unit 104 is constituted to include a radio reception unit 1041, a demultiplexing portion 1042, a demodulation unit 1043, and a decoding unit 1044.

The higher layer processing unit 101 performs processing in a medium access control (MAC) layer, a packet data convergence protocol (PDCP) layer, a radio link control (RLC) layer, and a radio resource control (RRC) layer. The higher layer processing unit 101 generates information required for controlling the transmission unit 103 and the reception unit 104 and outputs the information to the control unit 102.

The higher layer processing unit 101 receives information related to the terminal apparatus, such as the function of the terminal apparatus (UE capability), from the terminal apparatus. In other words, the terminal apparatus transmits the function thereof to the base station apparatus by using a higher layer signal.

The function of the terminal apparatus can include a parameter that indicates whether or not NAICS is supported. In the case of NAICS having a plurality of functions, the terminal apparatus can transmit individual parameters indicating whether or not each function is supported to the base station apparatus. For example, in the case of two functions PDSCH interference handling and CRS interference handling being included as NAICS, the terminal apparatus can transmit, to the base station apparatus, a signal indicating whether or not PDSCH interference handling is supported and a signal indicating whether or not CRS interference handling is supported. In addition, for example, in the case of including, as NAICS, a function of canceling or suppressing inter-user interference, such as MU-MIMO or non-orthogonal access, a signal that indicates whether or not inter-user interference handling is supported can be transmitted to the base station apparatus. Inter-user interference handling may be a function included in PDSCH interference handling. That is, the terminal apparatus that supports PDSCH interference handling can be assumed to have a function of handling inter-cell interference and inter-user interference.

In the following description, information related to the terminal apparatus includes information that indicates whether or not the terminal apparatus supports a prescribed function, or information that indicates whether or not introduction and test for a prescribed function of the terminal apparatus are completed. In the following description, whether or not to support a prescribed function includes whether or not introduction and test for a prescribed function are completed.

For example, in the case of the terminal apparatus supporting a prescribed function, the terminal apparatus transmits information (parameter) that indicates whether or not to support the prescribed function. In the case of the terminal apparatus not supporting the prescribed function, the terminal apparatus does not transmit information (parameter) that indicates whether or not to support the prescribed function. That is, whether or not to support the prescribed function is notified by whether or not to transmit information (parameter) that indicates whether or not to support the prescribed function. Information (parameter) that indicates whether or not to support a prescribed function may be notified by using one bit of 1 or 0.

The higher layer processing unit 101 determines whether or not to configure the NAICS assistance information and whether or not to configure the CRS assistance information. The base station apparatus can determine whether or not to configure the NAICS assistance information from the function of the terminal apparatus.

The radio resource control unit 1011 generates, or acquires from a higher node, downlink data (transport block) arranged in downlink PDSCH, system information, an RRC message, MAC CE, and the like. The radio resource control unit 1011 outputs the downlink data to the transmission unit 103 and outputs other information to the control unit 102. In addition, the radio resource control unit 1011 manages various types of configuration information as to the terminal apparatus 2. These types of configuration information can include configuration information as to an interfering terminal apparatus. Alternatively, configuration information as to an interfering terminal apparatus can be acquired from configuration information as to the terminal apparatus. In addition, configuration information as to an interfering base station apparatus can be included.

The scheduling unit 1012 determines a frequency and a subframe to which a physical channel (PDSCH and PUSCH) is assigned, a code rate and a modulation scheme (or MCS) for a physical channel (PDSCH and PUSCH), transmit power, and the like. The scheduling unit 1012 outputs determined information to the control unit 102.

The scheduling unit 1012 generates information used in scheduling of a physical channel (PDSCH and PUSCH) on the basis of a scheduling result. The scheduling unit 1012 outputs generated information to the control unit 102. In the present embodiment, the scheduling unit 1012, for example, schedules the terminal apparatus 2A and the terminal apparatus 2B in the same resource. While the same resource is used for simplification purposes in the present embodiment, the terminal apparatus 2A and the terminal apparatus 2B may be scheduled in different resources. Scheduling can also be performed in cooperation with the base station apparatus 1B.

The control unit 102, on the basis of information input from the higher layer processing unit 101, generates a control signal that controls the transmission unit 103 and the reception unit 104. The control unit 102 generates the downlink control information on the basis of information input from the higher layer processing unit 101 and outputs the downlink control information to the transmission unit 103.

The transmission unit 103, in accordance with the control signal input from the control unit 102, generates a downlink reference signal, codes and modulates the HARQ indicator, the downlink control information, and the downlink data input from the higher layer processing unit 101, multiplexes PHICH, PDCCH, EPDCCH, PDSCH, and the downlink reference signal, and transmits a signal to the terminal apparatus 2 through the transmit and receive antenna 105.

The coding unit 1031 codes the HARQ indicator, the downlink control information, and the downlink data input from the higher layer processing unit 101 by using a predetermined coding scheme such as block coding, convolutional coding, and turbo coding or by using a coding scheme determined by the radio resource control unit 1011. The modulation unit 1032 modulates a coding bit input from the coding unit 1031 by using a predetermined modulation scheme such as binary phase shift keying (BPSK), quadrature phase shift keying (QPSK), 16 quadrature amplitude modulation (QAM), 64QAM, and 256QAM or by using a modulation scheme determined by the radio resource control unit 1011.

The downlink reference signal generation unit 1033 generates a sequence as the downlink reference signal, the sequence being known by the terminal apparatus 2 and being obtained by using a rule predetermined on the basis of a physical cell identifier (physical cell identity, PCI, or cell ID) for identification of the base station apparatus 1A.

The multiplexing unit 1034 multiplexes a modulation symbol of each modulated channel and the generated downlink reference signal and the downlink control information. That is, the multiplexing unit 1034 arranges the modulation symbol of each modulated channel and the generated downlink reference signal and the downlink control information in a resource element.

The radio transmission unit 1035 performs an inverse fast Fourier transform (IFFT) of the multiplexed modulation symbol and the like to generate an OFDM symbol, adds a cyclic prefix (CP) to the OFDM symbol to generate a baseband digital signal, converts the baseband digital signal into an analog signal, removes an extraneous frequency component by filtering, converts the frequency of the analog signal up to a carrier frequency, amplifies the power of the analog signal, and outputs the analog signal to the transmit and receive antenna 105 to transmit the analog signal.

The reception unit 104, in accordance with the control signal input from the control unit 102, demultiplexes, demodulates, and decodes a receive signal received from the terminal apparatus 2 through the transmit and receive antenna 105 and outputs decoded information to the higher layer processing unit 101.

The radio reception unit 1041 converts an uplink signal received through the transmit and receive antenna 105 into a baseband signal by downconversion, removes an unnecessary frequency component, controls an amplification level to appropriately maintain a signal level, performs quadrature demodulation on the basis of an in-phase component and a quadrature component of the received signal, and converts the quadrature demodulated analog signal into a digital signal.

The radio reception unit 1041 removes a component corresponding to CP from the converted digital signal. The radio reception unit 1041 performs a fast Fourier transform (FFT) of the signal from which CP is removed, and extracts and outputs a frequency domain signal to the demultiplexing portion 1042.

The demultiplexing portion 1042 demultiplexes the signal input from the radio reception unit 1041 into signals such as PUCCH, PUSCH, and an uplink reference signal. This demultiplexing is performed on the basis of radio resource assignment information included in uplink grant that the base station apparatus 1A determines in advance by using the radio resource control unit 1011 and notifies to each terminal apparatus 2.

In addition, the demultiplexing portion 1042 compensates the propagation channels of PUCCH and PUSCH. In addition, the demultiplexing portion 1042 demultiplexes the uplink reference signal.

The demodulation unit 1043 performs an inverse discrete Fourier transform (IDFT) of PUSCH, acquires the modulation symbol, and demodulates the receive signal for each modulation symbol of PUCCH and PUSCH by using a predetermined modulation scheme such as BPSK, QPSK, 16QAM, 64QAM, and 256QAM or by using a modulation scheme that the base station apparatus 1A notifies in advance to each terminal apparatus 2 by using the uplink grant.

The decoding unit 1044 decodes a demodulated coding bit of PUCCH and PUSCH at a predetermined code rate of a predetermined coding scheme or at a predetermined code rate that the base station apparatus 1A notifies in advance to the terminal apparatus 2 by using the uplink grant, and outputs the decoded uplink data and the uplink control information to the higher layer processing unit 101. In the case of retransmitting PUSCH, the decoding unit 1044 performs decoding by using the demodulated coding bit and a coding bit retained in an HARQ buffer input from the higher layer processing unit 101.

Figure 3:
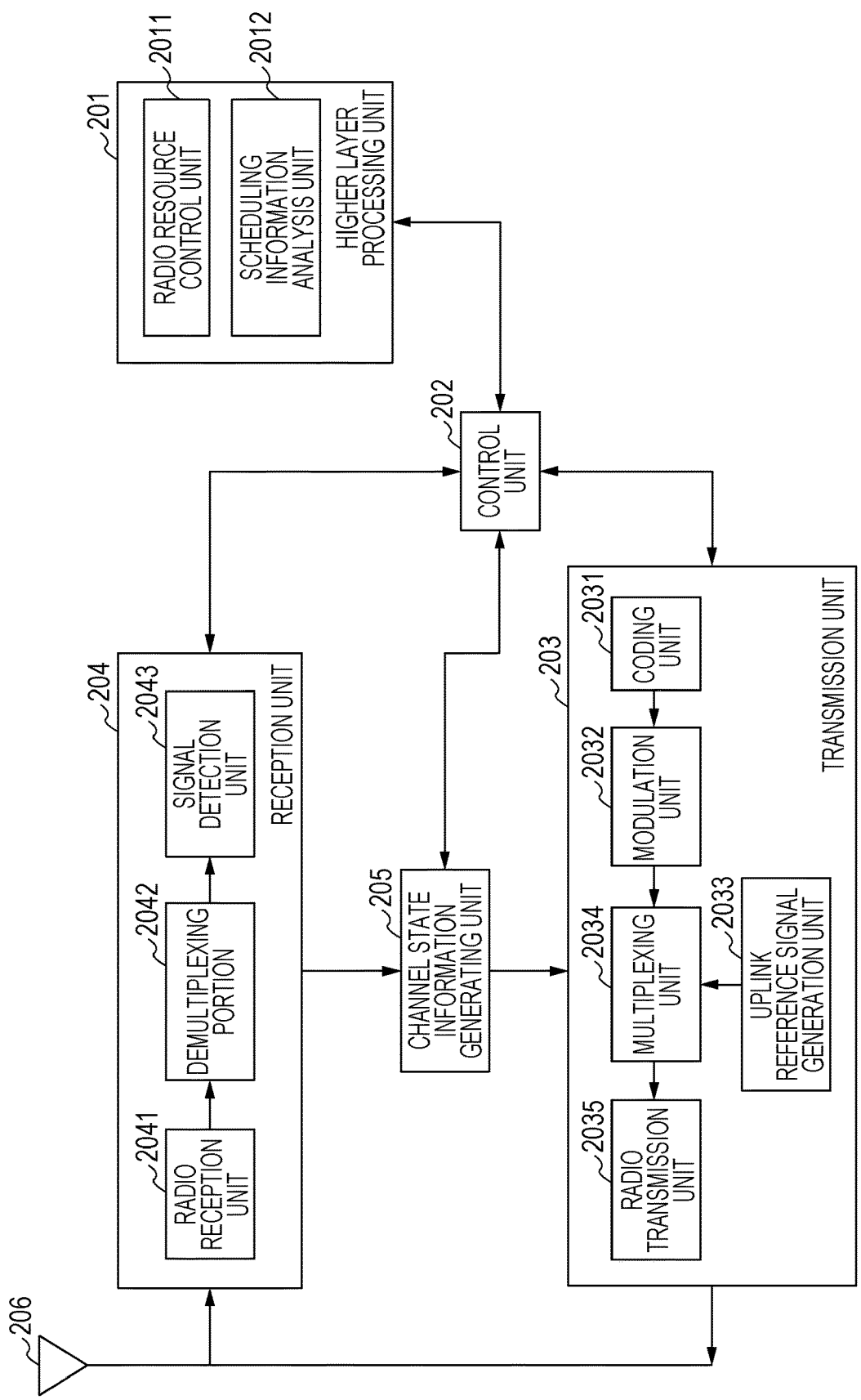
FIG. 3 is a block diagram illustrating a composition example of a terminal apparatus according to the present embodiment.

FIG. 3 is a schematic block diagram illustrating composition of the terminal apparatus 2 in the present embodiment. As illustrated in FIG. 3, the terminal apparatus 2 is constituted to include a higher layer processing unit 201, a control unit 202, a transmission unit 203, a reception unit 204, a channel state information generating unit 205, and a transmit and receive antenna 206. The higher layer processing unit 201 is constituted to include a radio resource control unit 2011 and a scheduling information analysis unit 2012. The transmission unit 203 is constituted to include a coding unit 2031, a modulation unit 2032, an uplink reference signal generation unit 2033, a multiplexing unit 2034, and a radio transmission unit 2035. The reception unit 204 is constituted to include a radio reception unit 2041, a demultiplexing portion 2042, and a signal detection unit 2043.

The higher layer processing unit 201 outputs uplink data (transport block) generated by a user operation or the like to the transmission unit 203. In addition, the higher layer processing unit 201 performs processing in a medium access control (MAC) layer, a packet data convergence protocol (PDCP) layer, a radio link control (RLC) layer, and a radio resource control (RRC) layer.

The higher layer processing unit 201 outputs, to the transmission unit 203, information that indicates the function of the terminal apparatus supported by the terminal apparatus.

The radio resource control unit 2011 manages various types of configuration information as to the terminal apparatus. In addition, the radio resource control unit 2011 generates information that is arranged in each uplink channel, and outputs the information to the transmission unit 203.

The radio resource control unit 2011 acquires configuration information related to CSI feedback transmitted from the base station apparatus and outputs the configuration information to the control unit 202.

The scheduling information analysis unit 2012 analyzes the downlink control information received through the reception unit 204 and determines scheduling information. In addition, the scheduling information analysis unit 2012, on the basis of the scheduling information, generates control information for controlling the reception unit 204 and the transmission unit 203 and outputs the control information to the control unit 202.

The control unit 202, on the basis of information input from the higher layer processing unit 201, generates a control signal that controls the reception unit 204, the channel state information generating unit 205, and the transmission unit 203. The control unit 202 outputs the generated control signal to the reception unit 204, the channel state information generating unit 205, and the transmission unit 203 to control the reception unit 204 and the transmission unit 203.

The control unit 202 controls the transmission unit 203 to transmit CSI generated by the channel state information generating unit 205 to the base station apparatus.

The reception unit 204, in accordance with the control signal input from the control unit 202, demultiplexes, demodulates, and decodes a receive signal received from the base station apparatus 1A through the transmit and receive antenna 206 and outputs decoded information to the higher layer processing unit 201. The reception unit 204 receives a reference signal corresponding to the base station apparatus 1A (called a first reference signal as well) included in the receive signal and a reference signal based on interference information configured from the base station apparatus 1A (called a second reference signal as well) and outputs the reference signals to the channel state information generating unit 205.

The radio reception unit 2041 converts a downlink signal received through the transmit and receive antenna 206 into a baseband signal by downconversion, removes an unnecessary frequency component, controls an amplification level to appropriately maintain a signal level, performs quadrature demodulation on the basis of an in-phase component and a quadrature component of the received signal, and converts the quadrature demodulated analog signal into a digital signal.

In addition, the radio reception unit 2041 removes a part corresponding to CP from the converted digital signal, performs a fast Fourier transform of the signal from which CP is removed, and extracts a frequency domain signal.

The demultiplexing portion 2042 demultiplexes the extracted signal into PHICH, PDCCH, EPDCCH, PDSCH, and a downlink reference signal. In addition, the demultiplexing portion 2042, on the basis of a channel estimation value of a desired signal acquired from channel measurement, compensates channels of PHICH, PDCCH, and EPDCCH and detects and outputs the downlink control information to the control unit 202. The control unit 202 outputs PDSCH and the channel estimation value of the desired signal to the signal detection unit 2043.

The signal detection unit 2043 detects a signal by using PDSCH and the channel estimation value and outputs the signal to the higher layer processing unit 201. In the case of NAICS being configured in a higher layer, a signal is detected after canceling or suppressing an interference signal. To cancel or suppress an interference signal, for example, linear detection that considers a channel estimation value of the interference signal, or interference cancellation or maximum likelihood detection that considers a channel estimation value of the interference signal or a modulation scheme of the interference signal is performed.

The signal detection unit 2043, in the case of the NAICS assistance information being configured in a higher layer, detects (specifies) a parameter required for estimation of an interference channel and/or demodulation of an interference signal. For a parameter having a plurality of values configured in the NAICS assistance information, blind detection of a value configured in an interference signal is performed with the plurality of values as candidates. For a parameter that is not configured in the NAICS assistance information, blind detection of a value configured in an interference signal may be performed with a value that is likely to be configured in the system as a candidate. The signal detection unit 2043 cancels or suppresses an interference signal of PDSCH/CRS by using the detected parameter.

Detecting a parameter of an interference signal increases the amount of calculation of the terminal apparatus, and thus detecting only necessary information is desired. Information that is required for demodulation can be determined from a parameter of a signal destined for the terminal apparatus or a part of parameters configured in an interference signal.

For example, in the case of the number of layers included in the downlink control information transmitted from a serving cell being three or more, the terminal apparatus may not cancel or suppress an interference signal on the basis of the NAICS assistance information even if the NAICS assistance information is configured. At this point, blind detection of a parameter of an interference signal based on the NAICS assistance information is not performed, and thus the amount of calculation of the terminal apparatus can be reduced.

The terminal apparatus does not assume MU-MIMO in the case of the number of layers included in the downlink control information transmitted from the serving cell being two and the number of code words being one. That is, an interference signal is canceled or suppressed on the basis of the NAICS assistance information that is related to different physical cell ID from the physical cell ID of the serving cell. In this case, since the NAICS assistance information that is related to the same physical cell ID as the physical cell ID of the serving cell can be excluded from candidates, the amount of calculation of the terminal apparatus can be reduced.

In the case of the number of layers included in the downlink control information transmitted from the serving cell being three or more, the terminal apparatus does not assume MU-MIMO. Furthermore, the terminal apparatus does not cancel or suppress an interference signal on the basis of the NAICS assistance information, and thus the amount of calculation of the terminal apparatus can be reduced.

In the case of the physical cell ID of the serving cell being the same as the physical cell ID associated with the NAICS assistance information, the terminal apparatus does not assume TM1, TM2, TM3, TM4, and TM6 of transmission modes included in the NAICS assistance information. That is, a transmission mode from the transmission modes included in the NAICS assistance information is limited to a DMRS-based transmission mode. The DMRS-based transmission mode is, for example, TM8/9/10. In this case, the terminal apparatus can limit an antenna port number to an interference signal of 7 or 8.

In the case of the physical cell ID of the serving cell being the same as the physical cell ID associated with the NAICS assistance information, the terminal apparatus assumes MU-MIMO and cancels or suppresses an interference signal. In this case, the terminal apparatus can assume the antenna port number for an interference signal to be 7 or 8 and perform blind detection.

The terminal apparatus can assume MU-MIMO and cancel or suppress an interference signal if the terminal apparatus can determine that MU-MIMO is used. In the case of the terminal apparatus determining that MU-MIMO is used, blind detection is not required to be performed for at least a cell-specific parameter, and the amount of calculation of the terminal apparatus can be reduced. The cell-specific parameter is, for example, QCL information, a ZP/NZP CSI-RS configuration, a PDSCH starting position, or a TDD UL/DL configuration.

As a method for the terminal apparatus to determine whether or not MU-MIMO is used, for example, the terminal apparatus can know that MU-MIMO is used by performing blind detection of a part of parameters of an interference signal. The number of parameters that the terminal apparatus requires in order to determine whether or not MU-MIMO is used is small compared with the case of canceling or suppressing inter-cell interference. Thus, the amount of calculation can be reduced in the case of the terminal apparatus being capable of determining that MU-MIMO is used.

For example, the terminal apparatus can make the determination from an initial value of a pseudo-random sequence that corresponds to a terminal-specific reference signal (UE-specific reference signal) associated with PDSCH. An initial value $c_{init}$ of the pseudo-random sequence corresponding to the terminal-specific reference signal associated with PDSCH is represented by Equation (1) below.

$$c_{init}=(\lfloor n_s/2 \rfloor+1)\cdot(2n_{ID}^{(nsciD)})\cdot 2^{16}+n\text{SCID} \quad (1)$$

ns represents a slot number in a radio frame. $n_{ID}^{(i)}$ (i=0, 1) is the physical cell ID in the case of using the DCI format 1A/2B/2C for DCI that is not assigned virtual cell ID in a higher layer or that is associated with PDSCH transmission. In other cases, $n_{ID}^{(i)}$ is virtual cell ID of a corresponding scrambling identity. $n_{ID}^{(i)}$ of variables constituting the initial value of the pseudo-random sequence is called a first variable as well.

The terminal apparatus can assume MU-MIMO and cancel or suppress an interference signal in a case where the value of the first variable constituting the initial value of the pseudo-random sequence corresponding to the terminal-specific reference signal associated with PDSCH of the serving cell is the same as the value of the first variable constituting the initial value of the pseudo-random sequence corresponding to the terminal-specific reference signal associated with PDSCH that is assumed on the basis of the NAICS assistance information.

The terminal apparatus can assume MU-MIMO and cancel or suppress an interference signal in a case where the initial value of the pseudo-random sequence corresponding to the terminal-specific reference signal associated with PDSCH of the serving cell is the same as the initial value of the pseudo-random sequence corresponding to the terminal-specific reference signal associated with PDSCH assumed on the basis of the NAICS assistance information.

The terminal apparatus can assume MU-MIMO and cancel or suppress an interference signal in a case where the first variable constituting the initial value of the pseudo-random sequence corresponding to the terminal-specific reference signal associated with PDSCH assumed on the basis of the NAICS assistance information is the same as the physical cell ID of the serving cell with the terminal apparatus having the transmission mode TM10 and virtual cell ID not configured in a higher layer.

As another method for the terminal apparatus to determine whether or not MU-MIMO is used, the terminal apparatus can know that MU-MIMO is used by the base station apparatus transmitting, to the terminal apparatus, information indicating that MU-MIMO is used or indicating intra-cell interference. The base station apparatus can signal whether or not MU-MIMO is used to the terminal apparatus by using a higher layer signal or a physical layer signal (for example, the downlink control information).

In the case of the base station apparatus performing signaling to the terminal apparatus by using a higher layer signal, the NAICS assistance information corresponding to inter-cell interference and/or the NAICS assistance information corresponding to MU-MIMO is individually configured in the base station apparatus. In this case, the terminal apparatus cancels or suppresses an interference signal on the basis of the NAICS assistance information corresponding to inter-cell interference and/or MU-MIMO.

In the case of the base station apparatus signaling whether or not MU-MIMO is used to the terminal apparatus by using a physical layer signal with the terminal apparatus having the transmission mode TM8/9 or with virtual cell ID not configured in TM10, blind detection of a parameter of an interference signal is performed, assuming that MU-MIMO is used. In the case of using MU-MIMO, either antenna ports are different, scrambling identities are different, or antenna ports and scrambling identities are different among users. Thus, blind detection can be performed even without assistance information. Accordingly, for example, if one bit indicating whether or not MU-MIMO is used is signaled from the base station apparatus by using a physical layer signal, the terminal apparatus can cancel or suppress inter-user interference even if the NAICS assistance information is not configured.

In the case of the base station apparatus signaling whether or not MU-MIMO is used to the terminal apparatus by using a physical layer signal with the terminal apparatus having the transmission mode TM10 and virtual cell ID configured, the terminal apparatus can assume that virtual cell ID is also configured for an interference signal in TM10 and can perform blind detection of other parameters. In other words, it can be assumed that the first variable constituting the initial value of the pseudo-random sequence of the terminal-specific reference signal associated with PDSCH destined for the terminal apparatus is the same as the first variable constituting the initial value of the pseudo-random sequence of the terminal-specific reference signal associated with PDSCH of an interference signal.

If the terminal apparatus can determine whether or not non-orthogonal access is used, an interference signal can be canceled or suppressed, assuming non-orthogonal access. For example, in the case of different transmit power being assigned among multiplexed terminal apparatuses and in the case of the transmit power of an interference signal being greater than the transmit power of a signal destined for the terminal apparatus, the interference signal is required to be canceled or suppressed by NAICS. Thus, the terminal apparatus has to detect a parameter configured in the interference signal. Meanwhile, in the case of the transmit power of a signal destined for the terminal apparatus being smaller than the transmit power of an interference signal, the interference signal is not necessarily canceled or suppressed by NAICS. Thus, a parameter configured in the interference signal may not be detected. In this case, the amount of calculation of the terminal apparatus can be reduced.

In order for the terminal apparatus to determine whether or not non-orthogonal access is used, for example, the base station apparatus can perform communication in a transmission mode corresponding to non-orthogonal access or by using a DCI format corresponding to non-orthogonal access. The DCI format corresponding to non-orthogonal access includes at least information related to power control. The information related to power control is, for example, the power difference between the transmit power destined for the terminal apparatus and the transmit power of an interference signal and interference signal power control information. A predetermined power offset value is configured in the interference signal power control information, and the sign of the power offset value can be signaled by using one bit.

In order for the terminal apparatus to determine whether or not non-orthogonal access is used, the interference signal power control information can be determined by blind detection. The blind detection may be performed on the basis of assistance information related to power control. In the case of making determination by blind detection, the terminal apparatus does not cancel or suppress an interference signal by using NAICS in a case where a condition that can determine MU-MIMO is satisfied, where PA configured in a signal destined for the terminal apparatus is compared with PA configured in the interference signal, and where PA configured in the signal destined for the terminal apparatus is greater than PA configured in the interference signal. Meanwhile, in the case where PA configured in the signal destined for the terminal apparatus is smaller than PA configured in the interference signal, the interference signal is canceled or suppressed by NAICS.

The transmission unit 203, in accordance with the control signal input from the control unit 202, generates an uplink reference signal, codes and modulates the uplink data (transport block) input from the higher layer processing unit 201, and multiplexes and transmits PUCCH, PUSCH, and the generated uplink reference signal to the base station apparatus 1A through the transmit and receive antenna 206.

The coding unit 2031 codes the uplink control information input from the higher layer processing unit 201 by using convolutional coding, block coding, or the like. In addition, the coding unit 2031 performs turbo coding that is based on information used in scheduling of PUSCH.

The modulation unit 2032 modulates a coding bit input from the coding unit 2031 by using a modulation scheme such as BPSK, QPSK, 16QAM, and 64QAM notified by using the downlink control information or by using a modulation scheme that is predetermined for each channel.

The uplink reference signal generation unit 2033 generates a sequence that is obtained by a predetermined rule (formula), on the basis of a physical cell identifier for identification of the base station apparatus 1A, a bandwidth in which the uplink reference signal is arranged, a cyclic shift notified by using the uplink grant, the value of a parameter for generation of a DMRS sequence, and the like.

The multiplexing unit 2034, in accordance with the control signal input from the control unit 202, performs a discrete Fourier transform (DFT) after arranging modulation symbols of PUSCH in parallel. In addition, the multiplexing unit 2034 multiplexes signals of PUCCH and PUSCH and the generated uplink reference signal for each transmit antenna port. That is, the multiplexing unit 2034 arranges signals of PUCCH and PUSCH and the generated uplink reference signal in a resource element for each transmit antenna port.

The radio transmission unit 2035 performs an inverse fast Fourier transform (IFFT) of the multiplexed signal, performs SC-FDMA modulation, generates an SC-FDMA symbol, adds CP to the generated SC-FDMA symbol, generates a baseband digital signal, converts the baseband digital signal into an analog signal, cancels an extraneous frequency component, converts the frequency of the analog signal to a carrier frequency by upconversion, amplifies the power of the analog signal, and outputs the analog signal to the transmit and receive antenna 206 to transmit the analog signal.

A program that operates in the base station apparatus and the terminal apparatus according to the present invention is a program (a program that causes a computer to function) that controls a CPU and the like in order to realize the function of the above embodiment according to the present invention. Information that is handled by these apparatuses is temporarily accumulated in a RAM when being processed and then is stored in various ROMs or HDDs, and the CPU reads, modifies, or writes the information if necessary. A recording medium storing the program may be any of a semiconductor medium (for example, a ROM or a non-volatile memory card), an optical recording medium (for example, a DVD, an MO, an MD, a CD, or a BD), a magnetic recording medium (for example, a magnetic tape or a flexible disk), and the like. The function of the above embodiment is not realized only by execution of the loaded program. The function of the present invention may be realized by processing of the program along with an operating system, another application program, or the like on the basis of instructions of the program.

In the case of distributing the program in the market, the program can be distributed by being stored in a portable recording medium or can be transferred to a server computer that is connected through a network such as the Internet. In this case, the present invention includes a storage apparatus of the server computer as well. A part or the entirety of the terminal apparatus and the base station apparatus in the above embodiment may be typically realized as LSI that is an integrated circuit. Each functional block of the reception apparatus may be configured as an individual chip, or a part or the entire functional blocks may be integrated into a chip. In the case of configuring each functional block as integrated circuits, an integrated circuit control unit that controls the integrated circuits is added.

A technique for the circuit integration is not limited to LSI and may be realized by a dedicated circuit or a general-purpose processor. In the case of emergence of a circuit integration technology that replaces LSI, due to advancement of semiconductor technology, an integrated circuit made by the technology can be used.

The present invention is not limited to the above embodiment. Application of the terminal apparatus of the present invention is not limited to a mobile station apparatus. Apparently, the terminal apparatus can be applied to a stationary type or non-movable type electronic apparatus installed indoors or outdoors, such as an AV apparatus, a kitchen apparatus, a cleaning or washing machine, an air conditioner, an office apparatus, a vending machine, and other daily life apparatuses.

While the embodiment of the invention is heretofore described in detail with reference to the drawings, specific composition of the invention is not limited to the embodiment. Designs and the like that are made to the extent not departing from the gist of the invention are also included in the claims.

INDUSTRIAL APPLICABILITY

The present invention is preferably used for a terminal apparatus, a base station apparatus, and a communication method.

The present international application claims the benefit of priority based on Japanese Patent Application No. 2014-167061 filed on Aug. 20, 2014. The entire contents of Japanese Patent Application No. 2014-167061 are incorporated in the present international application.

REFERENCE SIGNS LIST 1A, 1B BASE STATION APPARATUS
2A, 2B, 2C TERMINAL APPARATUS
101 HIGHER LAYER PROCESSING UNIT
102 CONTROL UNIT
103 TRANSMISSION UNIT
104 RECEPTION UNIT
105 TRANSMIT AND RECEIVE ANTENNA
1011 RADIO RESOURCE CONTROL UNIT
1012 SCHEDULING UNIT
1031 CODING UNIT
1032 MODULATION UNIT
1033 DOWNLINK REFERENCE SIGNAL GENERATION UNIT
1034 MULTIPLEXING UNIT
1035 RADIO TRANSMISSION UNIT
1041 RADIO RECEPTION UNIT
1042 DEMULTIPLEXING PORTION
1043 DEMODULATION UNIT
1044 DECODING UNIT
201 HIGHER LAYER PROCESSING UNIT
202 CONTROL UNIT
203 TRANSMISSION UNIT
204 RECEPTION UNIT
205 CHANNEL STATE INFORMATION GENERATING UNIT
206 TRANSMIT AND RECEIVE ANTENNA
2011 RADIO RESOURCE CONTROL UNIT
2012 SCHEDULING INFORMATION ANALYSIS UNIT
2031 CODING UNIT
2032 MODULATION UNIT
2033 UPLINK REFERENCE SIGNAL GENERATION UNIT
2034 MULTIPLEXING UNIT
2035 RADIO TRANSMISSION UNIT
2041 RADIO RECEPTION UNIT
2042 DEMULTIPLEXING PORTION
2043 SIGNAL DETECTION UNIT

The invention claimed is:

1. A terminal apparatus configured to communicate with a base station apparatus, the terminal apparatus comprising:
  radio reception circuitry configured and/or programmed to:
  receive, via a higher-layer signaling, configuration information indicating whether multiuser transmission is applied or not,
  monitor downlink control information (DCI) on a physical downlink control channel (PDCCH) and receive downlink data on a physical downlink shared channel (PDSCH), and
  signal detection circuitry configured and/or programmed to demodulate the PDSCH, wherein
  in a case where the radio reception circuitry is configured to monitor the DCI in a first transmission mode based on the configuration information, the DCI includes first information indicating presence and a modulation scheme of an interference signal and the signal detection circuitry is configured to specify a first antenna port of the interference signal out of a plurality of antenna ports based on the DCI to demodulate the PDSCH, and
  in a case where the radio reception circuitry is configured to monitor the DCI in a second transmission mode, the DCI does not include the first information, the DCI includes second information for power offset for the PDSCH, and the signal detection circuitry is configured to demodulate the PDSCH using the DCI.

2. The terminal apparatus according to claim 1, wherein the signal detection circuitry is configured to demodulate the PDSCH on a second antenna port out of the plurality of the antenna ports, the second antenna port being different from the first antenna port.

3. The terminal apparatus according to claim 1, wherein the first antenna port is either of antenna port 7 or antenna port 8.

4. The terminal apparatus according to claim 1, wherein the first transmission mode is a transmission mode based on a demodulation reference signal specific to a user apparatus.

5. The terminal apparatus according to claim 1, wherein the first transmission mode is either of transmission mode 9 or transmission mode 10.

6. The terminal apparatus according to claim 1, wherein the configuration information includes information related to the number of spatial multiplexing of the interference signal.

7. The terminal apparatus according to claim 1, wherein the DC't further includes number of layers, and in a case where the number of layers is three or more, the signal detection circuitry is configured to demodulate the PDSCH without consideration of the interference signal.

8. A communication method for a terminal apparatus configured to communicate with a base station apparatus, the communication method comprising:
  receiving, via a higher layer signaling, configuration information indicating whether multiuser transmission is applied or not,
  demodulating a physical downlink shared channel (PDSCH),
  monitoring downlink control information (DCI) on a physical downlink control channel (PDCCH), and
  receiving downlink data on the PDSCH, and wherein
  in a case where the DCI is monitored in a first transmission mode based on the configuration information, the DCI includes first information indicating presence and a modulation scheme of an interference signal and a first antenna port of the interference signal is specified out of a plurality of antenna ports based on the DCI to demodulate the PDSCH, and
  in a case where the DCI is monitored in a second transmission mode, the DCI does not include the first information, the DCI includes second information for power offset of the PDSCH, and the PDSCH is demodulated using the DCI.

* * * * *